No. 783,021. PATENTED FEB. 21, 1905.
L. S. CLARKE.
STEERING AND CONTROLLING MECHANISM FOR VEHICLES.
APPLICATION FILED JAN. 28, 1904.
3 SHEETS—SHEET 1.
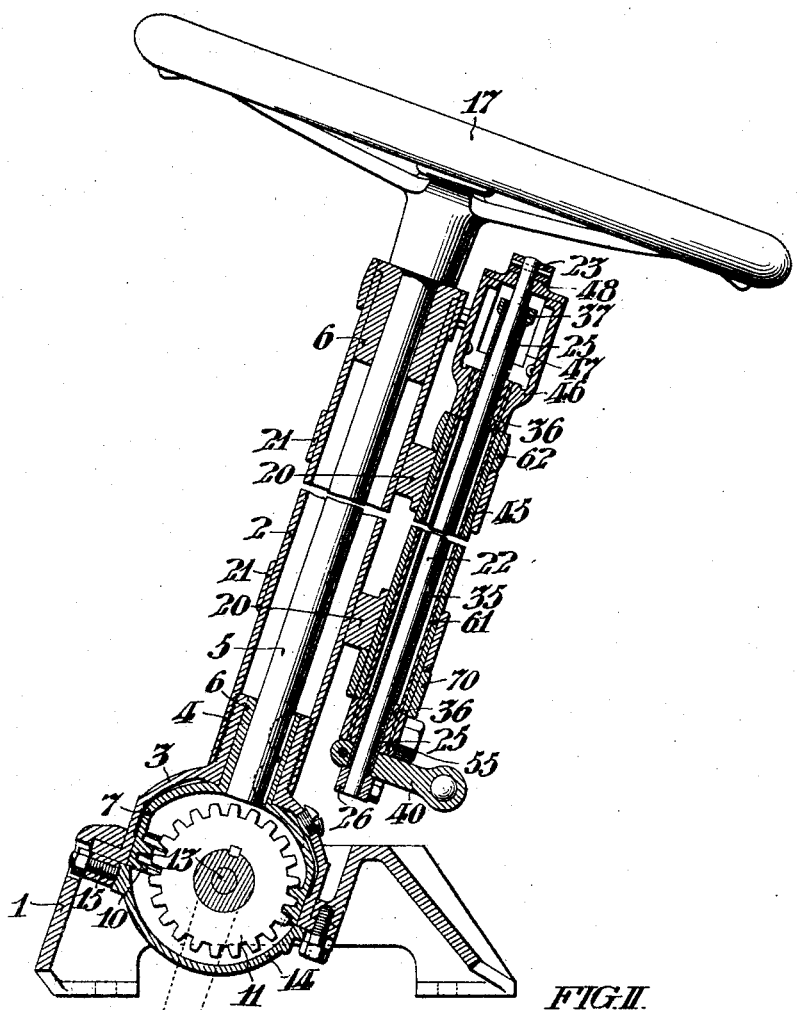
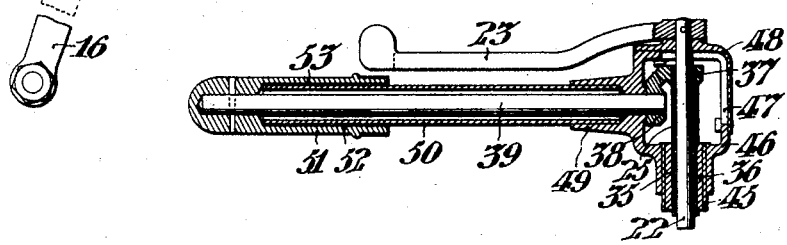
WITNESSES:
INVENTOR:
Louis S. Clarke

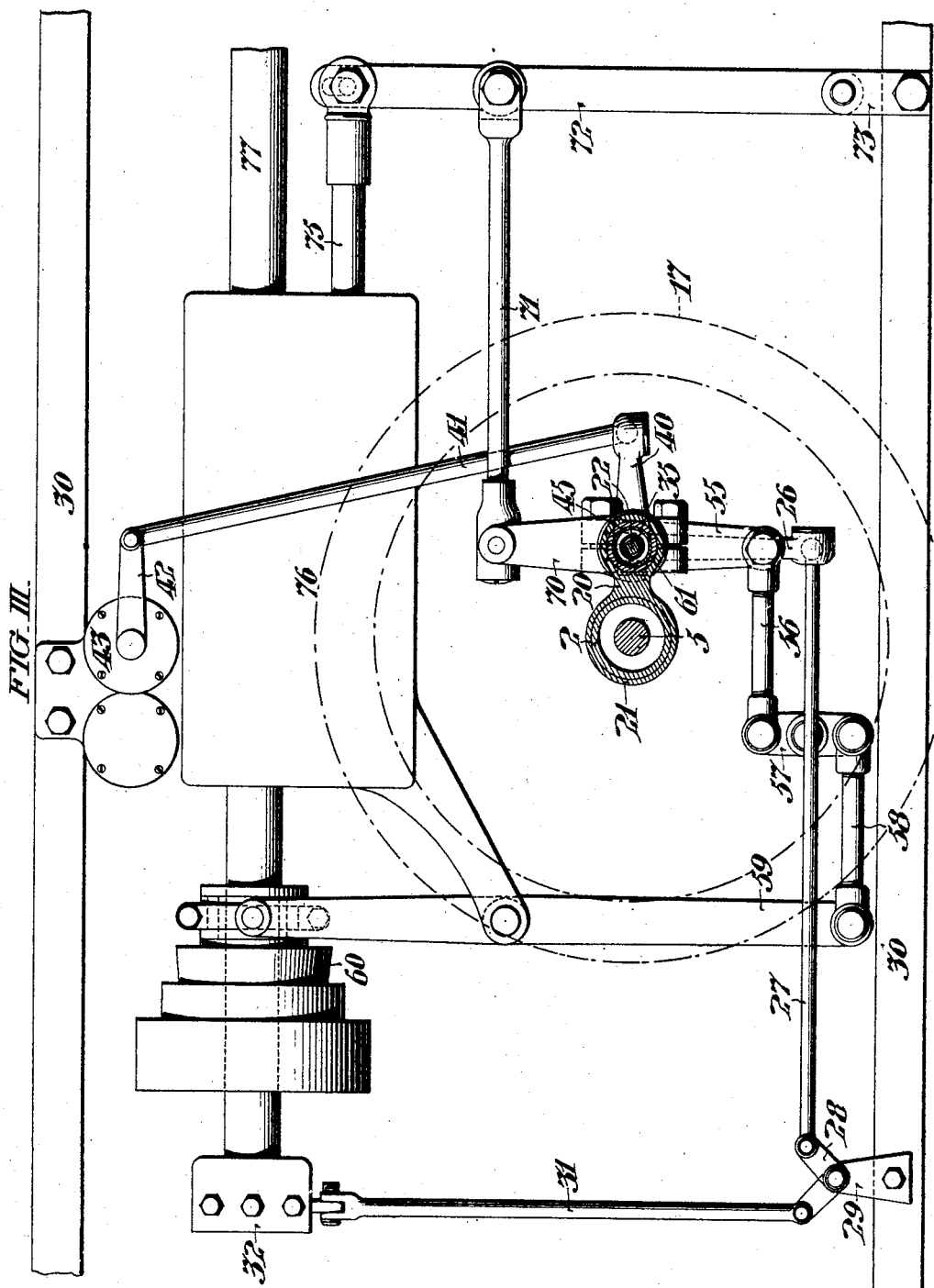

No. 783,021. PATENTED FEB. 21, 1905.
L. S. CLARKE.
STEERING AND CONTROLLING MECHANISM FOR VEHICLES.
APPLICATION FILED JAN. 28, 1904.
3 SHEETS—SHEET 3.
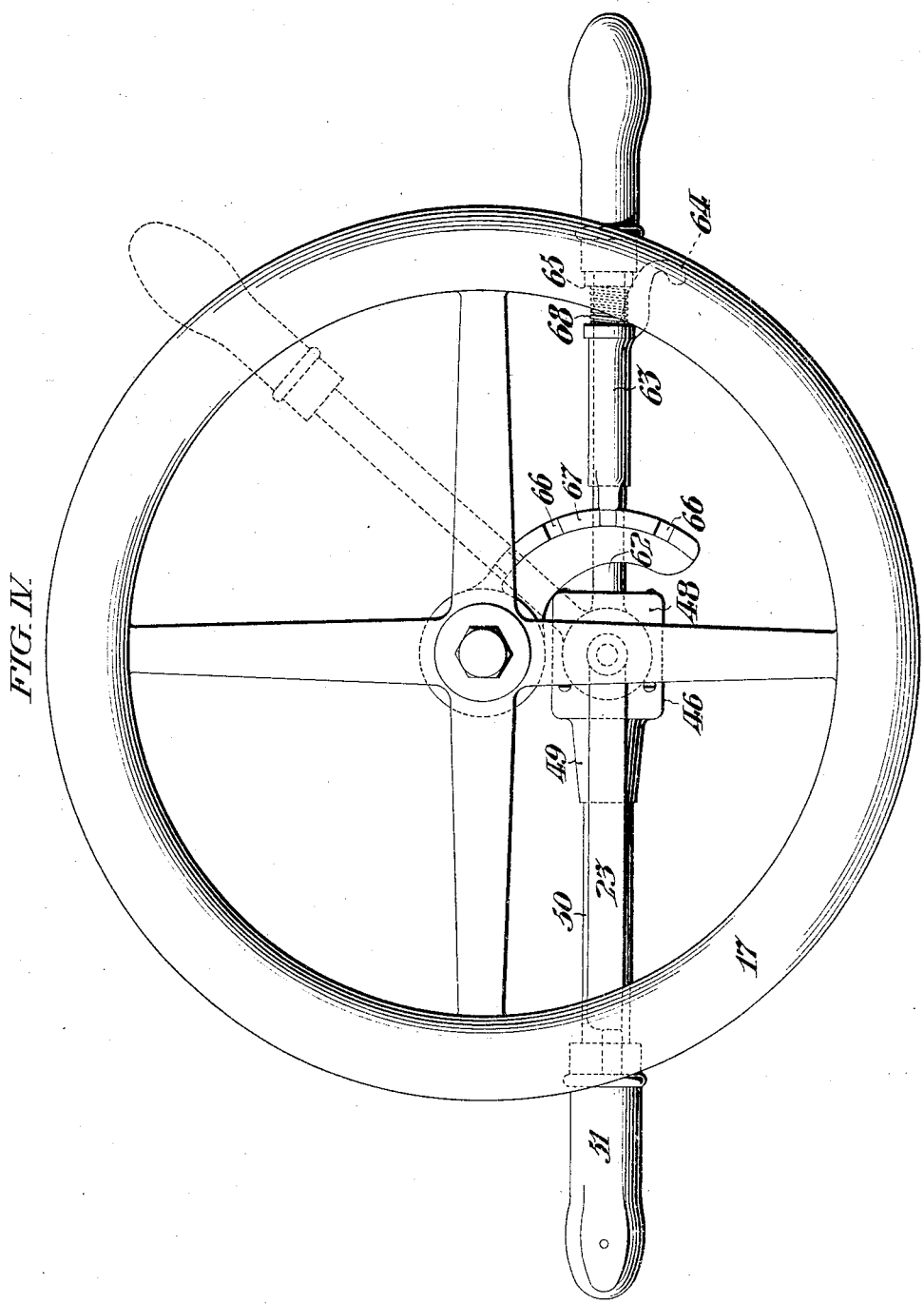
FIG. IV.
WITNESSES:
Arthur E. Paige
Thos. K. Lancaster
INVENTOR:
Louis S. Clarke
By his Attorney No. 783,021.                                                Patented February 21, 1905.

UNITED STATES PATENT OFFICE.

LOUIS S. CLARKE, OF HAVERFORD, PENNSYLVANIA.

STEERING AND CONTROLLING MECHANISM FOR VEHICLES.

SPECIFICATION forming part of Letters Patent No. 783,021, dated February 21, 1905.

Application filed January 28, 1904. Serial No. 190,990.

*To all whom it may concern:*

Be it known that I, LOUIS S. CLARKE, a citizen of the United States, residing at Haverford, in the county of Montgomery and State of Pennsylvania, have invented certain new and useful Improvements in Steering and Controlling Mechanism for Vehicles, of which the following is a specification.

This invention relates to steering and controlling mechanism for vehicles, and especially vehicles of that class known as automobiles, and its object is to simplify the construction and operation.

Another object is to arrange the parts more compactly so that the different parts thereof may be operated by holding the hand in substantially the same position, instead of moving the same from one place to another.

The invention resides in the combination and arrangements of parts as hereinafter described in the specification, set forth specifically in the appended claims, and as illustrated in the drawings which accompany and form a part of this specification, and in which, Figure I is a longitudinal sectional view of the steering and controlling mechanism;

Figure II is a longitudinal section of the handle for operating the controlling mechanism, and of the upper end of the said controlling mechanism;

Figure III is a transverse section of the controlling and steering mechanism and showing also a diagrammatic plan of other portions of the machine; and Figure IV is a top plan view of the steering and controlling mechanism.

Referring to the drawings,—

1 designates a base or support secured in any suitable manner to the frame of the vehicle, and upon which the upwardly inclined supporting tube 2 is supported, the supporting base 1 and the supporting tube 2 being secured together by means of the connecting member 3 with which the supporting tube 2 has screw-threaded connection, as indicated at 4.

5 designates a steering shaft rotatably supported within the supporting shaft 2, and 6 designates bushings for the said shaft. The steering shaft 5 is provided at its lower end with an enlarged cylindrical head 7 which is provided with an internal worm 10, the said worm being adapted to engage upon one side a worm gear 11, which is supported upon a shaft 13, the latter being supported upon an adjustable segment 14, adjustably secured to the head 7, the said segment being adjusted by means of the screw-threaded bolt 15.

Depending from the said shaft 13 and adapted to rotate with the worm gear 11 is an arm 16 which is adapted to be connected in any suitable manner, not shown, with the front wheels of an automobile or other vehicle. Connected to the upper end of the steering shaft 5 is a wheel 17, by means of which the said shaft 5 may be rotated in either direction. Rotation of the said shaft and of the worm 10 occasions rotation of the worm gear 11, and consequently of the arm 16, and the latter being connected with the front wheels of the vehicle, occasions movement thereof in the direction desired, which depends upon the direction of rotation of the steering wheel 17.

As thus far described, the construction is old and well known, and I do not claim the same as a part of my invention.

20 designates a couple of arms or brackets secured to the supporting tube 2 by means of sleeves 21, which surround the same and are secured thereto in any suitable manner, preferably by brazing, as clearly shown in Figure I. The said arms are provided with perforations within which is supported the controlling mechanism. The said controlling mechanism comprises a number of concentrically located rotatable shafts, including a central solid shaft 22, and a number of tubular shafts surrounding the said solid shaft, the shaft 22 being provided at its top end with a handle or finger piece 23, by means of which it is rotated.

25 designates bushings which constitute bearings for the shaft 22. To the lower end of the said shaft 22 a lever 26 is secured in any suitable manner, and to the outer free end thereof one end of a rod or link 27 is connected, the other end of said link being connected to one arm of a bell crank 28 supported upon a projection 29 secured to one of the side bars 30 of the frame of the machine, the other arm of the bell crank being connected to an arm or link 31 having connection with a vibratable spark breaking segment 32.

Surrounding the shaft 22 is a rotatable tubular shaft 35 and the bushings 36 constitute bearings therefor. Secured in any suitable manner to the upper end of the said tubular shaft is a bevel gear segment 37 which is adapted to be engaged by a bevel gear segment 38 secured to one end of a rotatable shaft or member 39 of the controller handle.

40 designates an arm or lever secured in any suitable manner to the lower end of the said tubular shaft 35, and 41 designates a rod or link one end of which is connected to the outer free end of the arm or lever 40, and the other end of which is connected to a lever 42 which is adapted to open and close the controlling valves, not shown, of the vaporizer 43.

45 designates a rotatable tubular shaft surrounding the shaft 35, and to the interiors of the upper and lower ends of which the bushings 36 are secured, and the upper end of which is provided with what may be termed a head 46, which is secured to the said shaft 45 in any suitable manner, preferably by brazing. The said head is hollow, and is provided with an opening 47 upon one side to facilitate inspection of the upper ends of the rotatable controlling shafts. The said opening is normally closed by means of a removable plate 48. The said head 46 is also provided with a boss or projection 49 which is perforated for the reception of the controlling handle, consisting of the tubular member 50, the solid shaft member 39, and the hand piece 51. The inner end of the hand piece 51 is provided with an opening 52 within which a bearing sleeve 53 is secured and within the said sleeve the outer end of a tubular member 50 of the handle is adapted to fit loosely, so that the said hand piece 51 may be rotated relatively to the tubular member 50.

The member 39 of the handle projects beyond the said opening 52, and is secured to the hand portion 51 and is adapted to rotate therewith when the latter is rotated.

55 designates a lever connected in any suitable manner to the lower end of the tubular shaft 45, and 56 designates a link or rod connecting the outer free end of the said lever 55 to one end of a lever 57 pivoted intermediate its ends upon any suitable support, the other end of the said lever being connected to a link or rod 58 which is in turn connected to one end of a lever 59, pivoted intermediate its ends upon any suitable support, the other end of the said lever 59 being connected to a clutch 60, as clearly indicated in Figure III of the drawings.

61 designates a rotatable tubular shaft which surrounds the shafts 22, 35, and 45, and which is journaled in the perforations through the arms or brackets 20 secured to the tubular support 2. 62 is a lever secured in any suitable manner preferably by brazing, to the upper end of the tubular shaft 61, and by means of which the said shaft is rotated.

Slidably mounted upon the said lever 62 is a catch 63, provided with a finger piece 64, by means of which the said catch may be pulled outwardly on the lever arm 62. 68 designates a coiled wire spring surrounding the lever arm 62, and located between the outer end of the slidable catch 63 and the shoulder 65 formed upon the said lever arm 62. The function of the said coiled spring 68 is to hold the slidable catch member 63 inwardly upon the lever arm 62 in position to engage a series of slots 66 formed in a curved arm 67, the said arm being rigidly secured to the tubular support 2.

Connected to the lower end of the said tubular shaft 61 is an arm 70. 71 designates a rod or link, one end of which is connected to the outer free end of the lever or arm 70, and the other end of which is connected intermediate the ends of a lever 72, one end of the said lever being connected to a lug or projection 73 secured to one of the side bars 30 of the frame of the vehicle, the other end of the said lever 72 being connected to a gear shaft 75 upon which are mounted gears, not shown, of different sizes, located in the casing 76 and adapted to engage other gears of different sizes located upon the main shaft 77 of the vehicle. By shifting the gears upon the shaft 75 so as to occasion the meshing of different gears within the transmission case, the speed of the machine may be increased or diminished, as desired.

In order to advance the spark lead, that is, in order to create a spark for the explosion of the charge of gas within the explosion cylinder at an earlier time, considered relatively to the stroke of the driving piston in the explosion cylinder of the machine, the lever 23 secured to the upper end of the central shaft 22 is moved forward. In order to rotate the shaft 35 connected to the valves of the vaporizing cylinders, the shaft member 39 of the handle is rotated forwardly, that is, rotated in a direction such that the top of the said member 39 and of the hand piece 51 moves away from a person sitting in the seat of the vehicle and toward the front of the machine.

Such forward rotation of the hand piece 51 and the member 39 occasions rotation of the shaft 35 to the right, and a movement of the arms or levers and links connected to the vaporizer mechanism in such a direction that the valves of the said mechanism are opened more or less widely depending upon the amount of rotation of the said shaft.

In order to rotate the tubular shaft 45 in a direction to engage the members of the clutch 60, the handle consisting of the members 39, 50 and 51 which are connected to and supported by the head piece 46 upon the upper end of the said shaft 45 is moved forwardly, that is, toward the front of the machine.

It is to be noted that such bodily forward movement of the member 39 occasions slight rotation of the tubular shaft 35 by reason of engagement of the gear segments 37 and 38. It will thus be seen that whenever the handle is moved bodily forward to engage the members of the clutch 60, that there is simultaneous rotation of the shaft 35 in a direction to slightly open the valves of the vaporizer. The tube 61, to which is connected the lever arms and links for changing the gear by means of which the speed of the machine may be increased or diminished, is controlled by means of the handle 62 located upon the side of the machine opposite the handle, consisting of the members 39, 50 and 51.

In order to speed up the machine, the said handle 62 is moved forward, that is toward the front of the machine and the greatest speed is secured when the handle is in the dotted line position indicated in Figure IV of the drawings.

It will be seen that the operation of the device is very greatly simplified by reason of the fact that all of the controlling members are moved forward when it is desired to speed up the machine and are moved rearwardly when it is desired to retard or reduce the speed of the machine.

It is also to be noted that the lever 23 is located in proximity to the hand piece 51, and that the said lever may be moved forward and back by using the thumb and finger of the left hand which is upon the hand piece 50.

By locating the members 23, 39, 50 and 51 in the manner indicated, it will be seen that the spark lead, vaporizing, and clutch mechanism may be controlled by a single hand without removing it from the hand piece 51. This, of course, leaves the other hand free to control the handle 62 and the steering wheel 17.

Having thus described my invention, I claim—

1. In a steering and controlling mechanism for vehicles, the combination of a supporting tube having supporting brackets secured thereto, a plurality of concentric controlling shafts supported by the said brackets, and a single hand piece connected to the said shafts for operating the same.

2. In a steering and controlling mechanism for vehicles, the combination of a supporting tube having supporting brackets secured thereto, a steering shaft mounted in the said supporting tube, a plurality of concentric controlling shafts supported by the said brackets, and a single hand piece connected to the said shafts for operating the same.

3. A controlling mechanism comprising two rotatable concentric shafts, one of which is provided with a head upon its upper end, the other being provided with a gear segment at its upper end, a tubular handle secured to the said head and a shaft extending through the said tubular handle, and through one of the walls of the said head, the said last mentioned shaft being provided with a gear segment which is in engagement with the gear segment first mentioned.

4. A controlling mechanism for vehicles, comprising a plurality of concentrically located rotatable shafts, and a hand piece which is adapted to occasion simultaneous rotation of the said shafts or separate rotation thereof, as desired.

5. A controlling mechanism for vehicles, comprising two tubular shafts located one within the other, a single hand piece connected to the said shafts for controlling the same, a shaft located within the innermost of the said shafts and extending therethrough and having a lever secured to one end thereof, the free end of the said lever being located in proximity to the said hand piece for the purpose described.

6. A controlling mechanism for vehicles comprising a plurality of concentrically located rotatable shafts, a single hand piece for controlling the rotation of the said shafts, and means interposed between the said shafts and said hand piece for occasioning rotation of the said shafts together or independently, as desired.

7. A controlling mechanism for vehicles comprising a plurality of concentrically located rotatable shafts, a single hand piece for controlling the rotation of the said shafts, the said hand piece being adapted to be moved bodily in one direction about one axis, and being also adapted to be rotated about another axis arranged at an angle to the first named axis, and means provided whereby the first named movement of the said hand piece occasions simultaneous rotation of the said shafts and whereby the second named movement occasions relative independent rotation of the said shafts.

In testimony that I claim the foregoing as my invention I have hereunto signed my name this 26th day of January, A. D. 1904.

LOUIS S. CLARKE.

In presence of—
  THOS. K. LANCASTER,
  LAURA KLEINFELDER.